United States Patent
Zhao et al.

(10) Patent No.: US 10,218,082 B2
(45) Date of Patent: Feb. 26, 2019

(54) WIDEBAND MICROSTRIP ANTENNAS AND ANTENNA ARRAYS

(71) Applicants: Nuctech Company Limited, Haidian District, Beijing (CN); Tsinghua University, Haidian District, Beijing (CN)

(72) Inventors: Ziran Zhao, Beijing (CN); Zhiqiang Chen, Beijing (CN); Yuanjing Li, Beijing (CN); Wanlong Wu, Beijing (CN); Yinong Liu, Beijing (CN); Jieqing Yang, Beijing (CN); Wenguo Liu, Beijing (CN); Bin Sang, Beijing (CN); Lei Zheng, Beijing (CN)

(73) Assignees: Nuctech Company Limited, Haidian District, Beijing (CN); Tsinghua University, Haidian District, Beijing (CN)

( * ) Notice: Subject to any disclaimer, the term of this patent is extended or adjusted under 35 U.S.C. 154(b) by 532 days.

(21) Appl. No.: 14/246,261

(22) Filed: Apr. 7, 2014

(65) Prior Publication Data
US 2016/0294070 A1    Oct. 6, 2016

(30) Foreign Application Priority Data
Aug. 15, 2013    (CN) .......................... 2013 1 0356878

(51) Int. Cl.
*G03H 5/00* (2006.01)
*H01Q 1/50* (2006.01)
(Continued)

(52) U.S. Cl.
CPC .............. *H01Q 21/08* (2013.01); *G03H 5/00* (2013.01); *H01Q 1/50* (2013.01); *H01Q 1/525* (2013.01);
(Continued)

(58) Field of Classification Search
CPC .............................. H01Q 5/378; H01Q 9/0457
See application file for complete search history.

(56) References Cited

U.S. PATENT DOCUMENTS

| | | |
|---|---|---|
| 5,444,453 A | 8/1995 | Lalezari |
| 5,977,915 A | 11/1999 | Bergstedt et al. |

(Continued)

FOREIGN PATENT DOCUMENTS

| | | |
|---|---|---|
| CN | 101420066 A | 4/2009 |
| CN | 201289899 Y | 8/2009 |

(Continued)

OTHER PUBLICATIONS

"The ARRL Antenna Handbook", 1988, pp. 2-24 to 2-25.*
(Continued)

*Primary Examiner* — Daniel Munoz
(74) *Attorney, Agent, or Firm* — Merchant & Gould P.C.

(57) ABSTRACT

There is provided a wideband patch antenna and an antenna array. The antenna includes a dielectric substrate of a rectangle shape, a radiation patch formed on a top surface of the dielectric substrate, a coupling patch formed on the top surface of the dielectric substrate and extending from a side of the dielectric substrate to a position from the radiation patch by a distance, a metal support arranged on the lower surface of the dielectric substrate and extending from the edge of the lower surface of the dielectric substrate downward to the ground, a layer of air having a predetermined thickness being formed between the lower surface of the dielectric substrate and the ground. According to the embodiments, it is possible to improve the directivity of the wideband microstrip antenna while maintaining its small size.

12 Claims, 7 Drawing Sheets

(51) Int. Cl.

| | | |
|---|---|---|
| *H01Q 1/52* | (2006.01) | |
| *H01Q 9/04* | (2006.01) | |
| *H01Q 21/00* | (2006.01) | |
| *H01Q 21/06* | (2006.01) | |
| *H01Q 21/08* | (2006.01) | |
| *H01Q 5/378* | (2015.01) | |
| *H01Q 13/02* | (2006.01) | |

(52) U.S. Cl.
CPC .............. *H01Q 5/378* (2015.01); *H01Q 9/045* (2013.01); *H01Q 9/0457* (2013.01); *H01Q 13/02* (2013.01); *H01Q 21/0081* (2013.01); *H01Q 21/065* (2013.01)

(56) References Cited

U.S. PATENT DOCUMENTS

| | | | |
|---|---|---|---|
| 2002/0000936 A1* | 1/2002 | Sheen | H01Q 13/206 343/700 MS |
| 2003/0122718 A1* | 7/2003 | Fang | H01Q 9/0421 343/702 |
| 2005/0104778 A1 | 5/2005 | Choi et al. | |
| 2005/0140549 A1 | 6/2005 | Leelaratne | |
| 2006/0227052 A1 | 10/2006 | Tavassoli Hozouri | |
| 2007/0126638 A1 | 6/2007 | Channabasappa | |
| 2007/0268188 A1* | 11/2007 | Guha | H01Q 9/0407 343/700 MS |
| 2009/0140930 A1 | 6/2009 | Tatarnikov et al. | |
| 2011/0050505 A1 | 3/2011 | Lim et al. | |
| 2012/0329404 A1 | 12/2012 | Yang | |
| 2014/0292601 A1* | 10/2014 | Kim | H01Q 9/045 343/749 |
| 2015/0381229 A1* | 12/2015 | Tzanidis | H01Q 1/50 455/73 |

FOREIGN PATENT DOCUMENTS

| | | |
|---|---|---|
| CN | 201758174 U | 3/2011 |
| CN | 203377377 U | 1/2014 |
| CN | 203386904 U | 1/2014 |
| DE | 10 2012 101 443 A1 | 8/2013 |
| EP | 0 993 069 A2 | 4/2000 |
| GB | 1 594 559 A | 7/1981 |
| GB | 2 370 158 A | 6/2002 |
| JP | 10-190351 A | 7/1998 |
| JP | 2007-088883 A | 4/2007 |
| RU | 2 122 263 C1 | 11/1998 |

OTHER PUBLICATIONS

Second Japanese Office Action for corresponding Japanese Patent Application No. 2014-096028, dated Nov. 10, 2015, 3 pgs.
Ukraine Office Action for corresponding Ukraine Patent Application No. 2014 06005, dated Nov. 26, 2015, 7 pgs.
European Office Action for corresponding European Patent Application No. 14162443.7 dated Feb. 16, 2016.
International Search Report and Written Opinion of the International Searching Authority for International Patent Application No. PCT/CN2014/072452 dated May 28, 2014.
Extended European Search Report for European Patent Application No. 14162443.7 dated Nov. 4, 2014.
Great Britain Combined Search and Examination Report for Great Britain Patent Application No. 1406416.6 dated Sep. 26, 2014.
Japanese Office Action for corresponding Japanese Patent Application No. 2014-096028 dated Jun. 16, 2015.
Russian Office Action for corresponding Russian Patent Application No. 2014119427 dated Jul. 3, 2015.
Jose, S. et al., "Design and Optimization of Broadband Micromachined Antenna", Annual India Conference IEEE, pp. 1-4, 2006.
Zurcher, J. et al., "Broadband Patch Antennas", Artech House Publishers, 25 pages, 1995.
Ukraine Office Action for corresponding Ukraine Patent Application No. 2014 06005 dated May 11, 2016, 6 pgs. English translation.
United Kingdom Examination Report for corresponding UK Patent Application No. 1406416.6 dated Jul. 28, 2016.
Sumy, J. et al., "Design and Optimization of Broadband Micromachined Antenna" IEEE Annual India Conference, pp. 1-4 (2006).
Chinese Office Action for corresponding Chinese Patent Application No. 201310356878.4 dated Jul. 14, 2016, 7 pgs.
Musale, P. et al., "Capacitive Feeding for Slotted microstrip patch", General Assembly and Scientific Symposium, (2011), 4 pgs.
European Office Action for corresponding European Patent Application No. 14162443.7 dated Oct. 20, 2016, 9 pgs.
Mayhew-Ridgers, G. et al. "Single-Layer Capacitive Feed for Wideband Probe-Fed Microstrip Antenna Elements", IEEE Transactions on Antennas and Propagation, 51(6): 1405-1407 (2003).
Sipal, V. et al., "Effect of Substrate Dimensions on Zeroth-Order Resonator Antennas", IEEE Antennas and Wireless Propagation Letters, 9: 107-109 (2010).
Second Chinese Office Action for corresponding Chinese Patent Application No. 201310356878.4 dated Mar. 7, 2017, 8 pages. (Rejecting all claims over D1 (Piyush Musale et al., "Capacitive Feeding for Slotted micros trip patch", General Assembly and Scientific Symposium) and D2 (CN101420066A).).
Third Chinese Office Action for corresponding Chinese Patent Application No. 201310356878.4 dated Jul. 27, 2017, 6 pages. (Rejecting all claims over D1 (Piyush Musale et al., "Capacitive Feeding for Slotted micros trip patch", General Assembly and Scientific Symposium) and D2 (CN101420066A).).
Summons to attend oral proceedings pursuant to Rule 115(1) EPC for corresponding European Patent Application No. 14162443.7 dated Aug. 8, 2017, 9 pages.

* cited by examiner

WIDEBAND MICROSTRIP ANTENNAS AND ANTENNA ARRAYS

This application claims benefit of Ser. No. 201310356878.4, filed 15 Aug. 2013 in China and which application is incorporated herein by reference. To the extent appropriate, a claim of priority is made to each of the above disclosed applications.

TECHNICAL FIELD

The present application generally relates to microstrip antennas and, in particular, to the wideband antenna technique.

BACKGROUND

In the millimeter wave holographic imaging technique, the complete data information can only be obtained by performing frequency scanning over a certain frequency band so as to calculate the three dimensional image of the object. In the scanning system, the transceiving antenna is located at the topmost end and responsible for transmitting signal to the object and receiving signals reflected from the object. The requirements on the transceiving antenna that is integral with the system include: 1. the volume shall be small to facilitate integration; 2. the directivity shall be strong, with the main beam directed to the object; and 3. the frequency band is so wide to satisfy the requirement of the system on the frequency band.

In the system integration, there are series of requirements on the transceiving antenna. By taking the miniaturization, directivity and integration with the system into account, a microstrip antenna is a better choice. However, the normal microstrip antenna typically has a narrow band. If a voltage standing wave ratio <2 is taken as a criterion, the relative band is typically smaller than 10%. Taking an antenna with a center frequency 30 GHz as an example, the operating band under a voltage standing wave ratio <2 is 3 GHz. Such band is far from satisfying the usage requirements.

Usually, there are several approaches to broaden the band of a microstrip antenna, including: 1) reducing the Q value of the equivalent circuit, 2) increasing the thickness of the dielectric, decreasing the permittivity $\in_r$, and increasing the loss tangent $^{tg\delta}$, tec., which, however, will increase the loss of the antenna, 3) adding a parasitic patch or utilizing the electromagnetic coupling effect, 4) designing an impedance matching network, which, however, will increase the size of the antenna, and 5) utilizing the array technique.

The various approaches mentioned above extend the band at the cost of the increase of the volume or the reduction of the efficiency. Furthermore, the directivity diagram of the antenna will vary as a function of the specific way of extending the band.

A millimeter wave wideband antenna has been developed over the years, and the technique has been well developed. With respect to the requirement on directivity described herein, the technique that can extend the band while providing a strong directivity is rare. In the existing method of extending the band, addition of a slot in the dielectric plate or a parasitic patch is usually used, which can only meet the requirement on bandwidth, but provide a weak directivity.

SUMMARY

In view of the problems of the prior art, there is provided a wideband microstrip antenna that has a small size and a strong directivity, and an antenna array.

In an aspect of the application, there is provided a wideband patch antenna including a dielectric substrate of a rectangle shape, a radiation patch formed on a top surface of the dielectric substrate, a coupling patch formed on the top surface of the dielectric substrate and extending from a side of the dielectric substrate to a position from the radiation patch by a distance, a metal support arranged on the lower surface of the dielectric substrate and extending from the edge of the lower surface of the dielectric substrate downward to the ground, a layer of air having a predetermined thickness being formed between the lower surface of the dielectric substrate and the ground.

Preferably, the metal support is made of copper.

Preferably, the layer of air has a thickness in the range from 0.5 mm to 3.0 mm.

Preferably, the distance is in the range from 0.4 mm to 0.5 mm.

Preferably, the coupling patch has a length in the range from 1.5 mm to 2.5 mm, and a width in the range from 0.5 mm to 1.2 mm.

Preferably, the radiation patch has a length in the range from 4.0 mm to 5.0 mm, and a width in the range from 2.0 mm to 3.0 mm.

Preferably, the wideband patch antenna operates in the K-Ka band.

Preferably, the wideband patch antenna further includes a microstrip feeder connected to the coupling patch.

Preferably, the metal support is a copper plate arranged on both sides of the dielectric substrate.

Preferably, the copper plate has a width in the range from 0.4 mm to 0.6 mm.

In another aspect of the application, there is provided an antenna array including a plurality of wideband patch antenna described above that are arranged in a line.

In still another aspect of the application, there is provided an array antenna including a dielectric substrate of a rectangle shape, a plurality of radiation patches arranged at intervals in the length direction of the dielectric substrate and formed on the top surface of the dielectric substrate, a plurality of coupling patches arranged in correspondence to the plurality of radiation patches, each of which formed on the top surface of the dielectric substrate and extending from a side of the dielectric substrate to a position from a corresponding radiation patch by a distance, a metal support arranged on the lower surface of the dielectric substrate and extending from the edge of the lower surface of the dielectric substrate downward to the ground, a layer of air having a predetermined thickness being formed between the lower surface of the dielectric substrate and the ground.

With the solutions described above, it is possible to improve the directivity of a wideband microstrip antenna while maintaining its small size.

BRIEF DESCRIPTION OF THE DRAWINGS

The following drawings illustrate implementations of the present invention. The drawings and implementations provide some embodiments of the present invention without limitation and exhaustion, where.

DETAILED DESCRIPTION OF THE EMBODIMENTS

The particular embodiments of the invention are described below in details. It shall be noted that the embodiments herein are used for illustration only, but not limiting the invention. In the description below, a number of particular details are explained to provide a better understanding to the invention. However, it is apparent to those skilled in the art that the invention can be implemented without these particular details. In other examples, well known circuits, materials or methods are not described so as not to obscure the invention.

Throughout the specification, the reference to "one embodiment," "an embodiment," "one example" or "an example" means that the specific features, structures or properties described in conjunction with the embodiment or example are included in at least one embodiment of the present invention. Therefore, the phrases "in one embodiment," "in an embodiment," "in one example" or "in an example" occurred at various positions throughout the specification may not refer to one and the same embodiment or example. Furthermore, specific features, structures or properties may be combined into one or several embodiments or examples in any appropriate ways. Moreover, it shall be understood to those skilled in the art that the term "and/or" used herein means any and all combinations of one or more listed items.

In order to obtain an antenna with a wide band, a strong directivity and a small size, the embodiments of the present application provide a wideband patch antenna.

The antenna includes a dielectric substrate of a rectangle shape, a radiation patch formed on a top surface of the dielectric substrate, a coupling patch formed on the top surface of the dielectric substrate and extending from a side of the dielectric substrate to a position from the radiation patch by a distance, a metal support arranged on the lower surface of the dielectric substrate and extending from the edge of the lower surface of the dielectric substrate downward to the ground, a layer of air having a predetermined thickness being formed between the lower surface of the dielectric substrate and the ground. According to the embodiment, the antenna operates at high frequency (for example, with the center frequency of K-Ka band, i.e., a millimeter wave antenna), and has a relative band above 20%. The main beam is directed to the space above the antenna, so that most of the energy can be used for effective detection. Furthermore, the antenna has a small size. For example, the size is equivalent to the operating wavelength.

Figure 1:
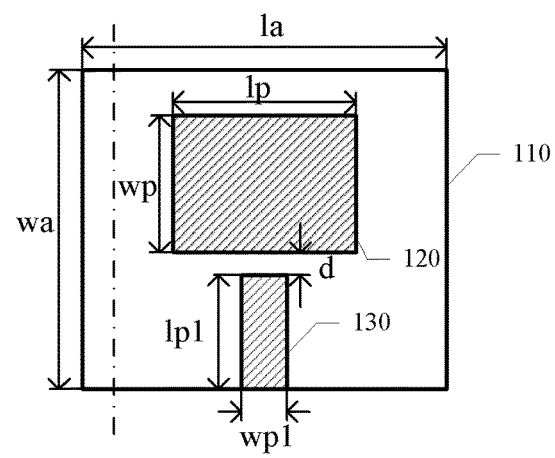
FIG. 1 illustrates a top view of a microstrip antenna according to an embodiment of the invention.
Figure 2:
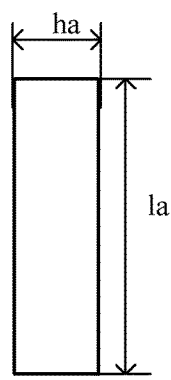
FIG. 2 illustrates a right side view of a microstrip antenna according to an embodiment of the invention.
Figure 3:
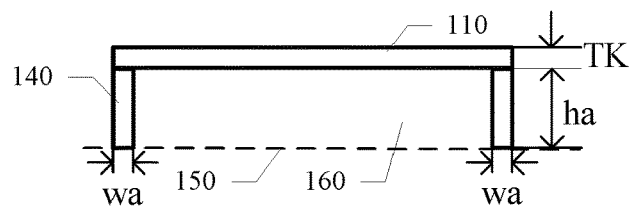
FIG. 3 illustrates a front view of a microstrip antenna according to an embodiment of the invention.
Figure 4:
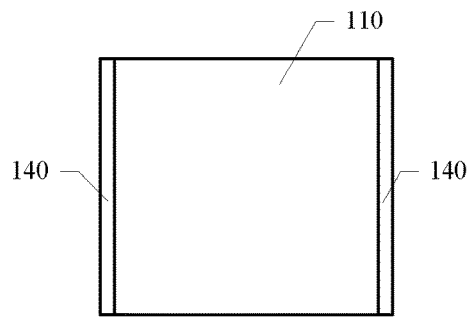
FIG. 4 illustrates a bottom view of a microstrip antenna according to an embodiment of the invention.

FIGS. 1, 2, 3, and 4 illustrate a top view, a right side view, a front view and a bottom view of a microstrip antenna according to an embodiment of the invention, respectively. As shown in FIG. 1, the antenna includes a dielectric substrate 110 of a rectangle shape, a radiation patch 120 and a coupling patch 130. As shown in FIG. 3, the antenna extends the band by adding a layer of air 160 and using the electromagnetic coupling, and uses a microstrip feeder of 50 ohms.

As shown, the radiation patch 120 is formed on the top surface of the dielectric substrate 110. The coupling patch 130 is formed on the top surface of the dielectric substrate 110, and extends from a side of the dielectric substrate 110 to a position from the radiation patch 120 by a distance. A metal support 140 is arranged on the lower surface of the dielectric substrate 110, and extends from about the edge of the lower surface of the dielectric substrate 110 downward to the ground 150. A layer of air 160 having a predetermined thickness ha is formed between the lower surface of the dielectric substrate and the ground.

In some embodiments, the dielectric substrate 110 is made of Rogers5880, with a width in the range from 0.2 mm to 0.4 mm, preferably 0.254 mm, a permittivity $\in$ larger than 2, preferably 2.2, and a loss tangent of 0.0009. The dielectric substrate has a length in the range from 6.5 mm to 8.5 mm, preferably 7.8 mm, a width in the range from 5 mm to 7 mm, preferably 6.1 mm.

In some embodiments, the layer of air 160 has a thickness ha in the range from 0.5 mm to 3.0 mm, preferably 1.0 mm. The coupling patch 130 has a length lpl in the range from 1.5 mm to 2.5 mm, preferably 1.9 mm, and a width wpl in the range from 0.5 mm to 1.2 mm, preferably 0.8 mm. The radiation patch 120 has a length lp in the range from 4.0 mm to 5.0 mm, preferably 2.7 mm, and a width wp in the range from 2.0 mm to 3.0 mm, preferably 4.5 mm. The radiation patch 120 and the coupling patch 130 are spaced by a distance d which is in the range from 0.4 mm to 0.5 mm, preferably 0.45 mm. Furthermore, a support is provided at the back of the layer of dielectric 160. Preferably, the support is a copper plate with a width in the range from 0.4 mm to 0.6 mm, preferably 0.5 mm. The metal support supports the dielectric substrate 110 on one hand, and provides good grounding during the installation on the other hand.

Figure 5:
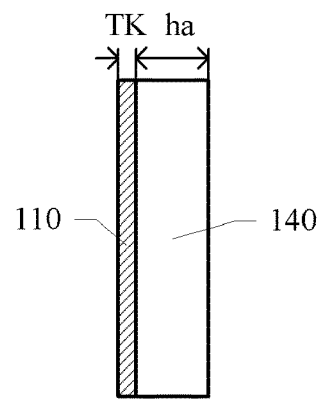
FIG. 5 illustrates a section view of a microstrip antenna along the direction shown in FIG. 1 according to an embodiment of the invention.

FIG. 5 illustrates a section view of a microstrip antenna along the direction shown in FIG. 1 according to an embodiment of the invention. As shown in FIG. 5, the metal support 140 is arranged at the edge of the lower surface of the dielectric substrate, and extends downward (to right as shown in the section view of FIG. 5).

Figure 6:
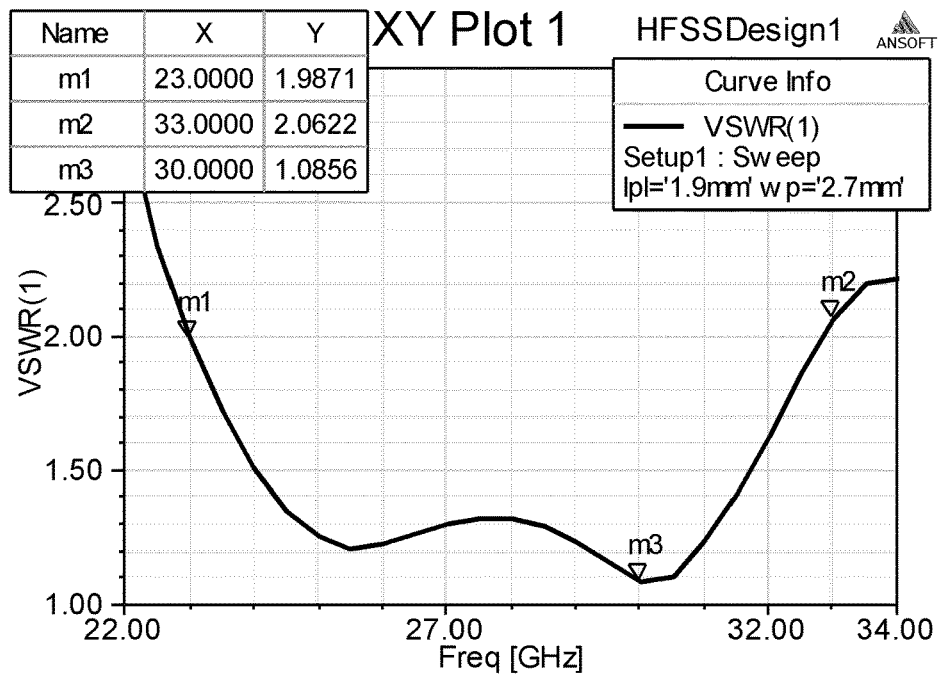
FIG. 6 illustrates a diagram of a voltage standing wave ratio of a microstrip antenna according to an embodiment of the invention.
Figure 7:
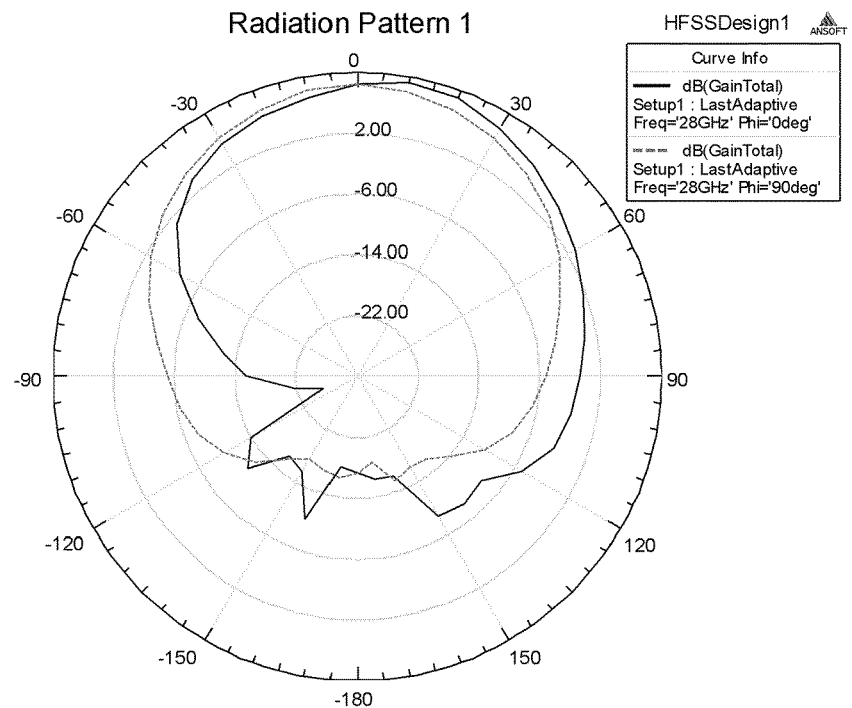
FIG. 7 illustrates a directivity diagram of a microstrip antenna at 28 GHz according to an embodiment of the invention, where the solid line and the dotted line indicate Phi=0° and Phi=90°, respectively.

FIG. 6 illustrates a diagram of a voltage standing wave ratio of a microstrip antenna according to an embodiment of the invention. As shown in FIG. 6, an antenna with VSWR<2 has an impedance bandwidth of 10 GHz (23 GHZ-33 GHz), a center frequency of 28 GHz, and a relative bandwidth of 35.7%, which satisfies the requirements on an ultra-wideband antenna. FIG. 7 illustrates a directivity diagram of a microstrip antenna at 28 GHz according to an embodiment of the invention, where the solid line and the dotted line indicate Phi=0° and Phi=90°, respectively. As can be seen from FIG. 7, the main beam of the antenna is directed to a direction right above the radiating surface, which meets the usage requirements.

Although an antenna with specific parameters is described above, it is obvious to those skilled in the art to appropriately change the parameters so as to change the center frequency and the relative bandwidth.

Figure 8:
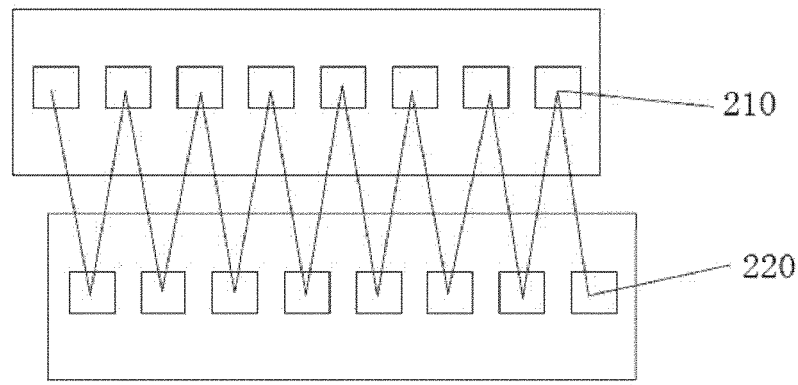
FIG. 8 illustrates a diagram of an array antenna according to another embodiment of the invention.

The structure of a single microstrip antenna has been described above. Those skilled in the art can form an antenna array with the antenna. FIG. 8 illustrates a diagram of an antenna array according to another embodiment of the invention. As shown in FIG. 8, the antenna array may function as a transmitting antenna or a receiving antenna. In some embodiments, the antenna array may include a plurality of wideband patch antennas as shown in FIG. 1 that are arranged in a line. In other embodiments, a single metal support may be provided for the plurality of patch antennas.

In some embodiments, there is provided an array antenna including a dielectric substrate of a rectangle shape, and a plurality of radiation patches and a plurality of coupling patches are arranged on the top surface of the dielectric substrate in correspondence to each other. For example, the plurality of radiation patches are arranged at intervals in the length direction of the dielectric substrate and formed on the top surface of the dielectric substrate. The plurality of coupling patches are arranged in correspondence to the plurality of radiation patches. Each of the coupling patches is formed on the top surface of the dielectric substrate and extends from a side of the dielectric substrate to a position from a corresponding radiation patch by a distance. The array antenna further includes a metal support arranged on the lower surface of the dielectric substrate and extending from the edge of the lower surface of the dielectric substrate downward to the ground, a layer of air having a predetermined thickness being formed between the lower surface of the dielectric substrate and the ground. In this way, an antenna array of a plurality of wideband patch antennas is formed.

The isolation between the transmitting antenna and the receiving antenna is an important parameter in a communication system. When the isolation is low, the crosstalk from transmitting signals to receiving signals has a high signal strength, resulting in a relative low communication quality. Typically, an antenna isolation indicates a ratio of a signal received by an antenna from another antenna to a signal transmitted by the other antenna.

In order to improve the isolation, a barrier may be provided on the path of electromagnetic coupling between the transmitting antenna and the receiving antenna, to block the electromagnetic coupling effect. Alternatively, a duplex transceiving antenna may be used, where the transmission and the receipt use an orthogonal line polarization and an orthogonal circular polarization, respectively. Furthermore, it is possible to provide an additional coupling path between the transmitting antenna and the receiving antenna to neutralize the original coupling signals.

In some embodiments, a waveguide horn radiator may be designed to match the millimeter wave microstrip antenna array described above, to improve the isolation between the transmitting antenna and the receiving antenna while maintaining the wideband and directivity of the transmitting antenna and the receiving antenna.

In some embodiments, each antenna of the antenna array extends the band by adding a layer of air and using the electromagnetic coupling as described above, and uses a microstrip feeder of 50 ohms. The whole system uses an antenna array in one dimension. The center-to-center spacing of the antennas is in the range from 8.0 mm to 15.0 mm, preferably 10.4 mm. The relative position of the transmitting antenna and the receiving antenna is shown in FIG. 8. The vertical spacing between the transmitting antenna and the receiving antenna is in the range from 20 mm to 40 mm, preferably 30 mm. The horizontal offset of the transmitting antenna to the receiving antenna is in the range from 4.0 mm to 6.0 mm, preferably 5.2 mm. The antenna array functions as a single-receive, single-transmit antenna.

The microstrip antenna in the antenna array may be designed according to the embodiment shown in FIG. 1. The horn radiator matching the antenna array includes a waveguide of a rectangle shape and horns. For example, in some embodiments, the horn of the radiator is comprised of a piece of rectangular waveguide and horns. The rectangular waveguide has a size identical to that of the patch of the corresponding microstrip antenna.

Figure 9:
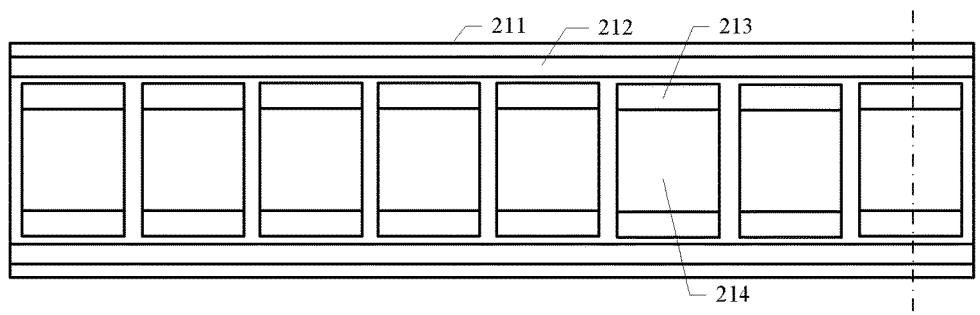
FIG. 9 illustrates a top view of a waveguide horn array according to another embodiment of the invention.
Figure 10:
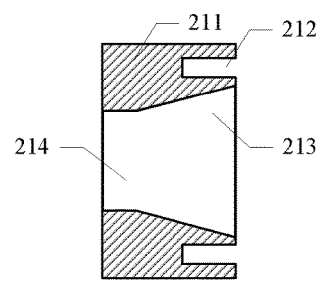
FIG. 10 illustrates a section view of the waveguide horn array shown in FIG. 9.

As shown in FIGS. 9 and 10, in some embodiments, there is provided a waveguide horn array. A rectangular metal plate 211 is processed to have a cross section comprised of a plurality of rectangular holes arranged in the length direction of the rectangular metal plate 211. The lower part of each hole is formed as a rectangular waveguide 214, and the upper part of each hole is formed as a horn 213. A groove 212 extending in the direction along which the plurality of holes are arranged and having a predetermined depth is formed at two sides of the holes on the top surface of the rectangular metal plate. For example, the horn has a height in the range from 10 mm to 14 mm, preferably 13 mm. The horn has a width corresponding to that of the waveguide, and a length in the range from 9 mm to 12 mm, preferably 11 mm. Two pieces of metal strips of 2 mm width are provided at two sides of the horn array, where the metal strips are placed in symmetry, to make the directivity diagram of the antenna added with the waveguide horn symmetric.

Furthermore, a plurality of threaded holes (not shown) are formed in the groove 212, to couple the waveguide horn array to the antenna array. In some embodiment, the groove 212 has a width in the range from 3.0 mm to 5.0 mm, preferably 4 mm, and a depth in the range from 8.0 mm to 12.0 mm, preferably 10 mm.

Figure 11:
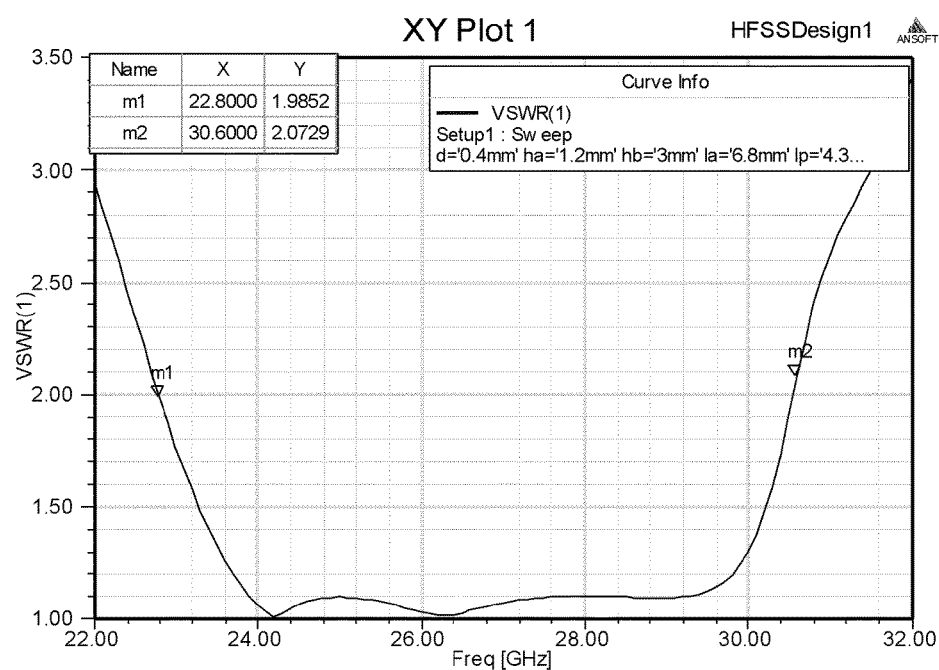
FIG. 11 illustrates a diagram of a voltage standing wave ratio of a transceiving antenna.
Figure 12:
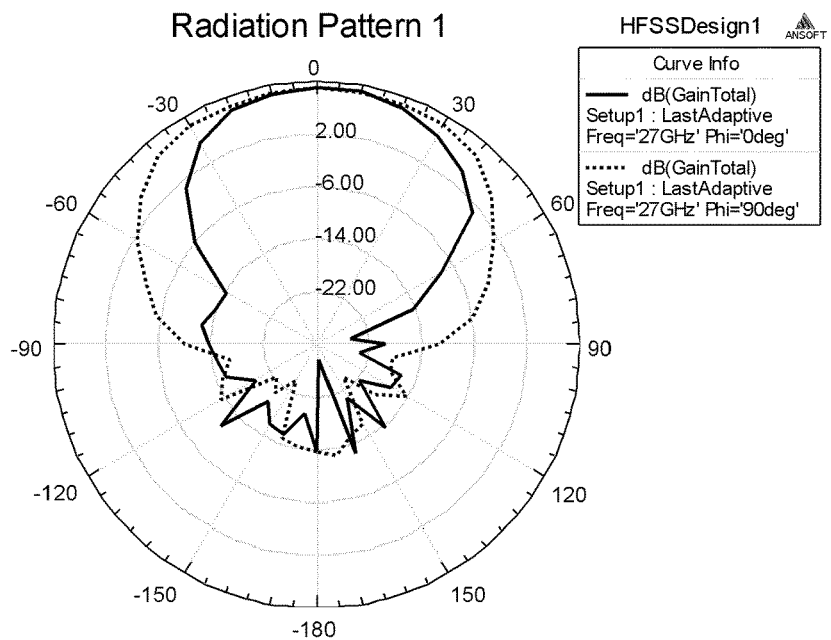
FIG. 12 illustrates a directivity diagram of an array antenna.
Figure 13:
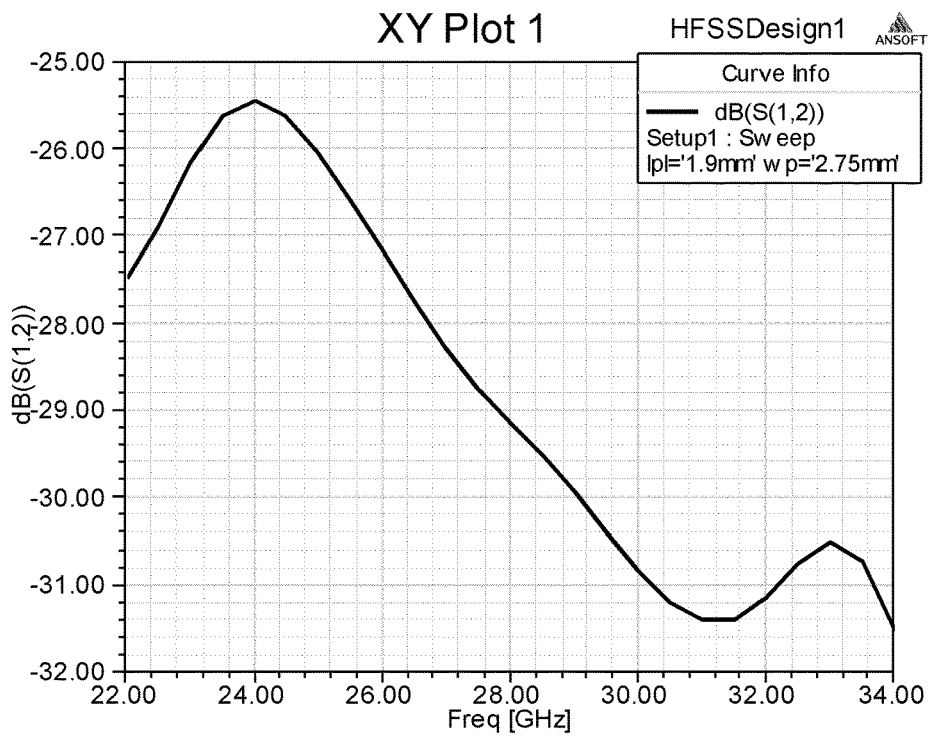
FIG. 13 illustrates the isolation of an array antenna without a horn array.
Figure 14:
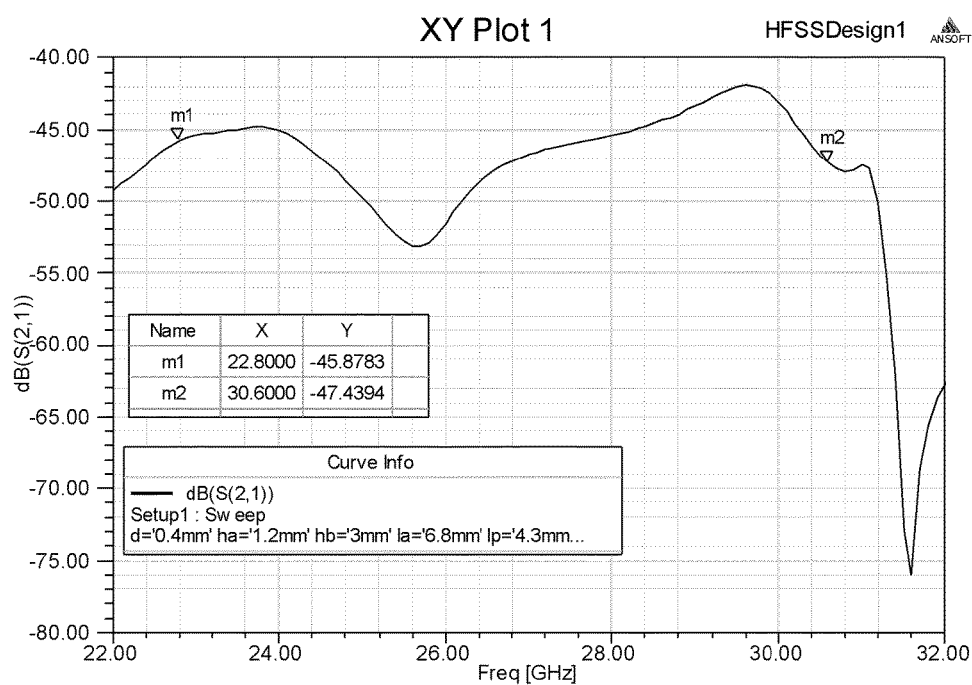
FIG. 14 illustrates the isolation of an array antenna with a horn array.

FIGS. 11 and 12 illustrate a diagram of a voltage standing wave ratio and a directivity diagram of a transceiving antenna, respectively. FIGS. 13 and 14 illustrate the isolation of an array antenna without a horn array and the isolation of an array antenna with a horn array. As can be seen from FIGS. 11 and 12, the antenna with a horn array maintains the advantages of a wide band, a focused main beam and a small size, the bandwidth under VSWR<2 is 22.8 GHz-30.5 GHz, and the relative bandwidth may reach 28.9%. As can be seem from the comparison of FIG. 13 and FIG. 14, the waveguide horn array enhances the isolation by 5-10 dB. In general, the new horn array achieves the purpose of enhancing the isolation.

As can be seen, the microstrip antenna according to the embodiments has an advantage that it has a small size that can be integrated easily. Furthermore, in the embodiment where the microstrip antenna is combined with a waveguide horn radiator, it is possible to maintain the good properties of the antenna in terms of bandwidth and directivity, while enhancing the isolation between the transmitting antenna and the receiving antenna in the system.

While the present invention has been described with reference to several typical embodiments, it is apparent to those skilled in the art that the terms are used for illustration and explanation purpose and not for limitation. The present invention may be practiced in various forms without departing from the esprit or essence of the invention. It should be understood that the embodiments are not limited to any of the foregoing details, and shall be interpreted broadly within the esprit and scope as defined by the following claims. Therefore, Modifications and alternatives falling within the scope of the claims and equivalents thereof are to be encompassed by the scope of the present invention which is defined by the claims as attached.

What is claimed is:

1. A wideband patch antenna comprising:
a dielectric substrate of a rectangle shape;
a radiation patch formed on a top surface of the dielectric substrate;
a coupling patch formed on the top surface of the dielectric substrate and extending from a side of the dielectric substrate to a position from the radiation patch by a distance; and
a metal support contacting edges of the lower surface of the dielectric substrate and extending perpendicularly from the lower surface of the dielectric substrate downward as a ground layer, a layer of air having a predetermined thickness being formed between the lower surface of the dielectric substrate and the metal support.

2. The wideband patch antenna according to claim 1, wherein the metal support is made of copper.

3. The wideband patch antenna according to claim 1, wherein the layer of air has a thickness in the range from 0.5 mm to 3.0 mm.

4. The wideband patch antenna according to claim 1, wherein the distance is in the range from 0.4 mm to 0.5 mm.

5. The wideband patch antenna according to claim 1, wherein the coupling patch has a length in the range from 1.5 mm to 2.5 mm, and a width in the range from 0.5 mm to 1.2 mm.

6. The wideband patch antenna according to claim 1, wherein the radiation patch has a length in the range from 4.0 mm to 5.0 mm, and a width in the range from 2.0 mm to 3.0 mm.

7. The wideband patch antenna according to claim 1, wherein the wideband patch antenna operates in the K-Ka band.

8. The wideband patch antenna according to claim 1, further comprising a microstrip feeder connected to the coupling patch.

9. The wideband patch antenna according to claim 1, wherein the metal support is a copper plate arranged on both sides of the dielectric substrate.

10. The wideband patch antenna according to claim 9, wherein the copper plate has a width in the range from 0.4 mm to 0.6 mm.

11. An antenna array comprising a plurality of wideband patch antenna according to claim 1 that are arranged in a line.

12. An array antenna comprising:

a dielectric substrate of a rectangle shape;

a plurality of radiation patches arranged at intervals in the length direction of the dielectric substrate and formed on the top surface of the dielectric substrate;

a plurality of coupling patches arranged in correspondence to the plurality of radiation patches, each of which formed on the top surface of the dielectric substrate and extending from a side of the dielectric substrate to a position from a corresponding radiation patch by a distance and a metal support contacting edges the lower surface of the dielectric substrate and extending perpendicularly from of the lower surface of the dielectric substrate downward as a ground layer, a layer of air having a predetermined thickness being formed between the lower surface of the dielectric substrate and the metal support.

* * * * *